(12) United States Patent
Dolgin et al.

(10) Patent No.: US 10,164,765 B2
(45) Date of Patent: Dec. 25, 2018

(54) RECEIVERS AND METHOD FOR DETECTING A NON-PERSISTENT COMMUNICATION SUPERIMPOSED ON AN OVERT COMMUNICATION CHANNEL

(71) Applicant: RAYTHEON COMPANY, Waltham, MA (US)

(72) Inventors: Benjamin P. Dolgin, Alexandria, VA (US); Andrew Kowalevicz, Arlington, VA (US); Gary M. Graceffo, Burke, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/892,799

(22) Filed: Feb. 9, 2018

(65) Prior Publication Data

US 2018/0234231 A1 Aug. 16, 2018

Related U.S. Application Data

(60) Provisional application No. 62/457,549, filed on Feb. 10, 2017.

(51) Int. Cl.
*H04B 10/06* (2006.01)
*H04L 7/00* (2006.01)
*H04B 10/60* (2013.01)

(52) U.S. Cl.
CPC ........... *H04L 7/0075* (2013.01); *H04B 10/60* (2013.01)

(58) Field of Classification Search
CPC ...... H04B 10/60; H04B 10/61; H04B 10/616; H04B 10/612; H04B 10/615; H04B 10/671; H04B 10/676; H04B 10/67; H04B 10/54; G02B 17/004; G02B 5/284; G02B 6/29338; G02F 2/00; G02F 1/00; H04L 7/0075; H04J 14/005
(Continued)

(56) References Cited

U.S. PATENT DOCUMENTS

3,936,603 A * 2/1976 Guppy ................. H04L 1/20
375/376
5,581,575 A * 12/1996 Zehavi .............. H03M 13/2707
370/335
(Continued)

*Primary Examiner* — Hibret A Woldekidan
(74) *Attorney, Agent, or Firm* — Lando & Anastasi, LLP (57) ABSTRACT

Aspects are generally directed to optical receivers and methods for detecting a non-persistent communication superimposed on an overt communication channel. In one example, an optical receiver includes an optical resonator to receive an optical signal having one or more symbols encoded thereon at a modulated symbol repetition rate, the modulated symbol repetition rate being modulated relative to a nominal symbol repetition rate. The optical resonator is configured to emit an intensity-modulated output optical signal that has a variation in an intensity thereof corresponding to a symbol transition in the optical signal. The optical receiver further includes signal processing circuitry including a clock configured to generate a reference signal, a photodetector configured to generate a trigger signal, and a non-persistent communication decoder configured to determine a temporal misalignment between the symbol transition and the nominal symbol repetition rate based on the reference signal and the trigger signal.

20 Claims, 5 Drawing Sheets

(58) Field of Classification Search
USPC ....... 398/202, 208, 209, 211, 154, 155, 156, 398/163, 186
See application file for complete search history.

(56) References Cited

U.S. PATENT DOCUMENTS

| | | | | |
|---|---|---|---|---|
| 5,796,757 | A * | 8/1998 | Czaja | H04B 1/707 |
| | | | | 375/E1.002 |
| 5,952,936 | A * | 9/1999 | Enomoto | G08C 19/28 |
| | | | | 340/12.17 |
| 8,295,712 | B2 * | 10/2012 | Chen | H04B 10/516 |
| | | | | 385/14 |
| 9,755,674 | B2 * | 9/2017 | Graceffo | H04B 1/0475 |
| 9,900,031 | B2 * | 2/2018 | Kowalevicz | H04L 9/16 |
| 9,973,281 | B2 * | 5/2018 | Kowalevicz | G02B 5/28 |
| 9,989,989 | B2 * | 6/2018 | Kowalevicz | H04L 9/16 |
| 2015/0318982 | A1 * | 11/2015 | Kowalevicz | H04L 9/16 |
| | | | | 375/238 |
| 2015/0319061 | A1 * | 11/2015 | Kowalevicz | H04L 9/16 |
| | | | | 709/224 |
| 2018/0091227 | A1 * | 3/2018 | Dolgin | H04B 10/616 |
| 2018/0102853 | A1 * | 4/2018 | Dolgin | H04B 10/612 |
| 2018/0145764 | A1 * | 5/2018 | Dolgin | H04B 10/676 |
| 2018/0145765 | A1 * | 5/2018 | Kowalevicz | H04B 10/676 |
| 2018/0167145 | A1 * | 6/2018 | Dolgin | H04B 10/67 |
| 2018/0205463 | A1 * | 7/2018 | Karpov | H04B 10/25077 |

\* cited by examiner

RECEIVERS AND METHOD FOR DETECTING A NON-PERSISTENT COMMUNICATION SUPERIMPOSED ON AN OVERT COMMUNICATION CHANNEL

CROSS-REFERENCE TO RELATED APPLICATION

This application claims priority under 35 U.S.C. § 119(e) to U.S. Provisional Application Ser. No. 62/457,549, titled "DETECTOR FOR NON-PERSISTENT COMMUNICATIONS SUPERIMPOSED ON AN OVERT COMMUNICATION CHANNEL," filed on Feb. 10, 2017, which is hereby incorporated herein by reference in its entirety.

BACKGROUND

Many optical communication systems manipulate light waves to carry information. For instance, often a light source (e.g., a laser source) is modulated to change one or more properties of emitted light, such as an amplitude, phase, or frequency, to convey overt information. In some cases, an underlying signal, such as a radio frequency signal, may be modulated via amplitude, phase, or frequency modulation, or any combination thereof, and the light source may be modulated by the underlying signal. Optical receivers receive the light waves and measure properties or variations of the light wave, from which the underlying signal and the overt information may be recovered.

SUMMARY

Various aspects and examples described herein provide non-persistent communication receivers and related methods for detecting a non-persistent communication superimposed on an overt communication channel. Certain examples are directed to an optical receiver that includes an optical resonator positioned to receive an optical signal. In particular, the received optical signal may have one or more symbols encoded thereon at a modulated symbol repetition rate. One or more components of the optical receiver are configured to determine a temporal misalignment between a symbol transition in the optical signal and a nominal symbol repetition rate to decode a non-persistent communication superimposed on the optical signal. In various examples, the optical receiver may be insensitive to the particular data payload corresponding to the one or more symbols and may decode the non-persistent communication independent of processes for demodulating the data payload.

According to an aspect, provided is an optical receiver. In one example, the optical receiver comprises an optical resonator positioned to receive an optical signal having one or more symbols encoded thereon at a modulated symbol repetition rate, the modulated symbol repetition rate being modulated relative to a nominal symbol repetition rate of the optical signal. The optical resonator is configured to emit an intensity-modulated output optical signal, the intensity-modulated output optical signal having a variation in an intensity thereof corresponding to a symbol transition in the one or more symbols encoded on the optical signal. The optical receiver further comprises signal processing circuitry coupled to the optical resonator, the signal processing circuitry including a clock configured to generate a reference signal, the reference signal having a reference repetition rate that corresponds to the nominal symbol repetition rate of the optical signal. The signal processing circuitry further includes a photodetector configured to generate a trigger signal having a pulse temporally aligned to the variation in the intensity-modulated output optical signal, and a non-persistent communication decoder configured to determine a temporal misalignment between the symbol transition and the nominal symbol repetition rate based at least in part on the reference repetition rate of the reference signal and the trigger signal, the temporal misalignment being representative of a non-persistent communication.

In various examples, the temporal misalignment is a jitter of a source of the optical signal. In some examples, the optical signal is a phase-modulated optical signal, and the symbol transition corresponds to a phase change in the optical signal. According to various examples, the non-persistent communication decoder is configured to mix the reference signal and the trigger signal to generate a mixed signal, and a magnitude of the mixed signal is proportional to the temporal misalignment.

According to various examples, the pulse of the trigger signal is shorter in duration than the nominal symbol repetition rate. In some examples, the optical receiver further comprises a low-pass filter coupled to non-persistent communication decoder and configured to filter the mixed signal. In various examples, the clock is configured to generate at least one of a saw clock signal and a square-wave clock signal as the reference signal, and the reference repetition rate of the reference signal is temporally aligned with the nominal symbol repetition rate.

According to an aspect, provided is an optical receiver. In one example, the optical receiver comprises an optical resonator having a pair of semi-reflective surfaces positioned to receive an optical signal having one or more symbols encoded thereon at a modulated symbol repetition rate, the modulated symbol repetition rate being modulated relative to a nominal symbol repetition rate of the optical signal. The optical resonator is configured to resonate the optical signal between the pair of semi-reflective surfaces and emit an intensity modulated output optical signal, and the intensity-modulated output optical signal has a variation in an intensity thereof corresponding to a symbol transition in the one or more symbols encoded on the optical signal. The optical receiver further comprises signal processing circuitry coupled to the optical resonator, the signal processing circuitry including a clock configured to generate a reference signal, the reference signal having a reference repetition rate that corresponds to the nominal symbol repetition rate of the optical signal. The signal processing circuitry further includes a non-persistent communication decoder configured to determine a temporal misalignment between the symbol transition and the nominal symbol repetition rate based at least in part on the reference repetition rate of the reference signal and the intensity-modulated output optical signal, the temporal misalignment being representative of a non-persistent communication.

In various examples, the temporal misalignment is a jitter of a source of the optical signal. In some examples, the optical signal is a phase-modulated optical signal, and the symbol transition corresponds to a phase change in the optical signal. According to some examples, the non-persistent communication decoder is configured to mix the reference signal and the intensity-modulated output optical signal to generate a mixed signal, and a magnitude of the mixed signal is proportional to the temporal misalignment. In some examples, the optical receiver further comprises a low-pass filter coupled to non-persistent communication decoder and configured to filter the mixed signal. In various examples, the clock is configured to generate at least one of a saw clock signal and a square-wave clock signal as the reference signal, and the reference repetition rate of the reference signal is temporally aligned with the nominal symbol repetition rate.

According to another aspect, provided is a method of detecting a communication superimposed on an overt communication channel. In at least one example, the method comprises the acts of receiving an optical signal having one or more symbols encoded thereon at a modulated symbol repetition rate, the modulated symbol repetition rate being modulated relative to a nominal symbol repetition rate of the optical signal, resonating the optical signal within an optical resonator, emitting an intensity-modulated output optical signal from the optical resonator, the intensity-modulated output optical signal having a variation in an intensity thereof corresponding to a symbol transition in the one or more symbols encoded on the optical signal, receiving a reference signal, the reference signal having a reference repetition rate that corresponds to the nominal symbol repetition rate of the optical signal, and determining, based on the reference signal and the intensity-modulated output optical signal, a temporal misalignment between the symbol transition and the nominal symbol repetition rate, the temporal misalignment being representative of a non-persistent communication.

According to various examples, resonating the optical signal within the optical resonator includes trapping the optical signal between a pair of semi-reflective surfaces by reflecting at least a portion of the optical signal between the pair of semi-reflective surfaces. In some examples, determining the temporal misalignment includes mixing the reference signal and the intensity-modulated output optical signal to generate a mixed signal, where a magnitude of the mixed signal is proportional to the temporal misalignment.

In various examples, the method further comprises generating a trigger signal, the trigger signal having a pulse temporally aligned to the variation in the intensity-modulated output optical signal. In further examples, determining the temporal misalignment includes mixing the reference signal and the trigger signal to generate a mixed signal, and where a magnitude of the mixed signal is proportional to the temporal misalignment. In some examples, the method further comprises low-pass filtering the mixed signal. In some examples, the method further comprises generating at least one of a saw clock signal and a square-wave clock signal as the reference signal, and the reference repetition rate of the reference signal is temporally aligned with the nominal symbol repetition rate.

Still other aspects, embodiments, and advantages of these exemplary aspects and examples are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and examples described herein may also include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Various aspects and examples described herein provide non-persistent communication receivers and related methods for detecting a non-persistent communication superimposed on an overt communication channel. Certain examples are directed to an optical receiver that includes an optical resonator, such as an etalon. The optical resonator is positioned to receive an optical signal having one or more symbols encoded thereon at a modulated symbol repetition rate. In particular, the modulated symbol repetition rate may be modulated relative to a nominal symbol repetition rate of the optical signal to carry a non-persistent communication. The optical resonator is configured to resonate optical signal energy based on the received optical signal, and emit an output optical signal having one or more variations in an intensity thereof that correspond to a symbol transition in the received optical signal. Based on a reference signal and the intensity-modulated output optical signal, one or more components of the optical receiver are configured to determine a temporal misalignment between the symbol transition and the nominal symbol repetition rate. In various examples, the temporal misalignment is representative of the non-persistent communication.

As discussed above, there exist many optical communication systems for manipulating light waves to carry information. To convey information, often these systems include a light source that is modulated to change various properties of emitted light (e.g., amplitude, phase, or frequency). Generally, an optical receiver collects the phase-encoded, amplitude-encoded, or frequency-encoded light and performs one or more demodulation processes to convert the phase modulation, amplitude modulation, or frequency modulation into useful information. As discussed herein, this decoded information is referred to as "overt" information, an "overt" communication, and/or a communication received on an "overt" communication channel.

Various examples described herein are directed to optical receivers and methods of detecting a non-persistent communication. In many instances, the non-persistent communication is a communication superimposed (e.g., overlaid)

on an overt communication channel. That is, the non-persistent communication is a communication distinct from the overt communication. In various examples, the non-persistent communication is encoded on an overt communication channel by modulating the symbol repetition rate of an optical signal. That is, the timing of one or more symbols in an overt optical communication may be shifted (e.g., modulated) to convey a non-persistent communication. Accordingly, the non-persistent communication may be conveyed through an overt communication channel that is concurrently used for overt information. While in one particular example described herein the non-persistent communication may be encoded using the jitter of an optical signal source (e.g., clock jitter), various other implementations are within the scope of the present disclosure.

Particular examples of the optical receivers described herein may demodulate a non-persistent communication independent of the decryption processes for the underlying overt communication. That is, various examples of the optical receivers described herein do not require decryption of the overt communication to demodulate the non-persistent communication. Such examples significantly reduce the complexity of the described optical receivers when compared to typical approaches for detecting jitter. Moreover, the described optical receivers and methods offer the flexibility to accommodate various modulation techniques, such as Phase-Shift Keying (PSK), Quadrature Amplitude Modulation (QAM), M-ary, M-PSK, and Intensity Modulation (IM), to name a few examples. Various other benefits and advantages of the described aspects and examples are further described herein with reference to the Drawings.

It is to be appreciated that embodiments of the apparatuses and methods discussed herein are not limited in application to the details of construction and the arrangement of components set forth in the following description or illustrated in the accompanying drawings. The apparatuses and methods are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present apparatuses and methods or their components to any one positional or spatial orientation.

Figure 1:
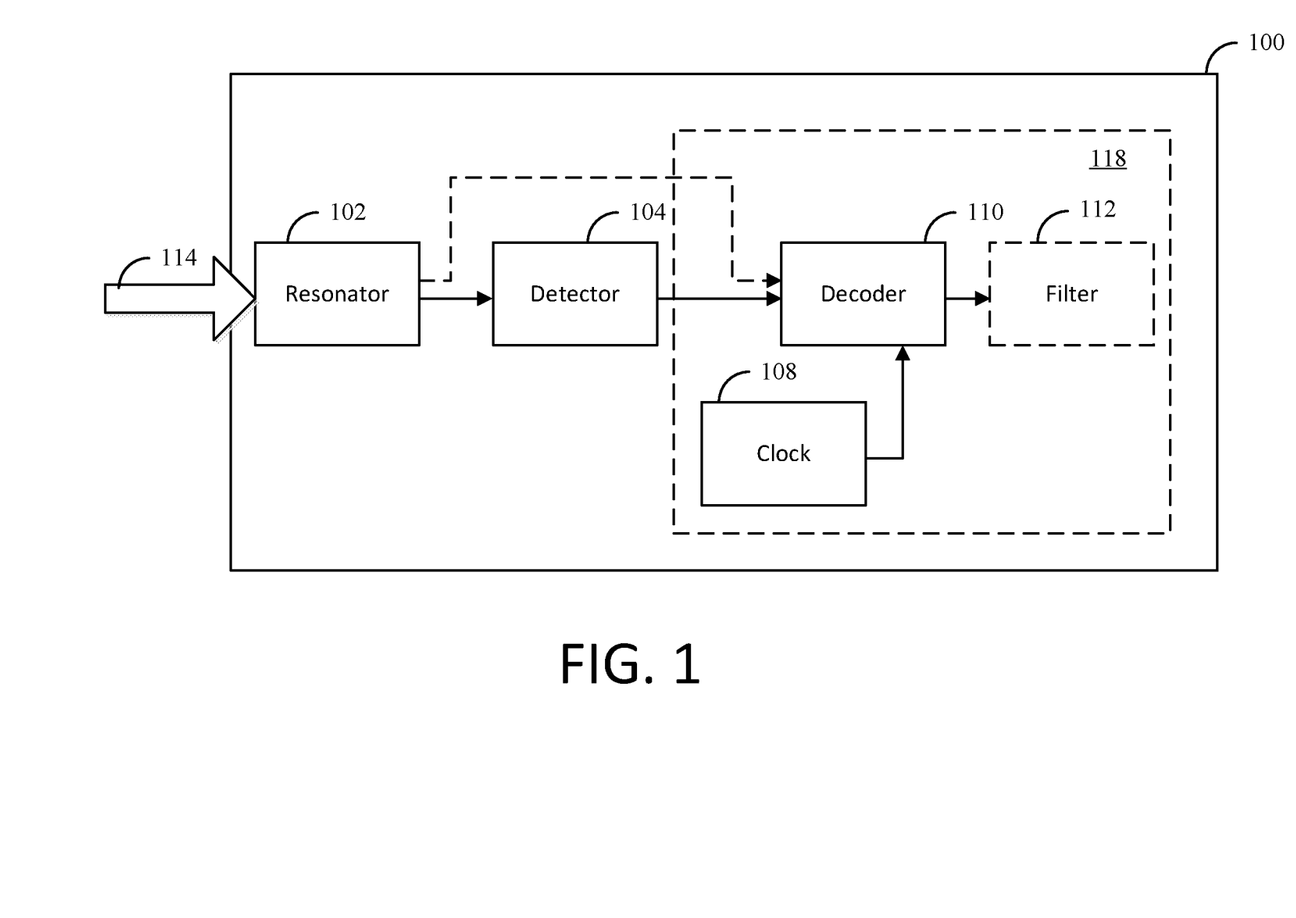
FIG. 1 is a block diagram of an optical receiver according to various examples described herein.

FIG. 1 illustrates a block diagram of a non-persistent communication optical receiver 100 ("optical receiver") according to various examples described herein. As illustrated, the optical receiver 100 may include an optical resonator 102, a photodetector 104, and signal processing circuitry 118. The signal processing circuitry 118 is shown as including a clock 108, a non-persistent communication decoder 110, and a filter 112. As shown in FIG. 1, the optical resonator 102 may be positioned to receive an optical signal (represented by arrow 114). For example, the optical resonator 102 may receive one or more optical signals by free-space optical communication or an optical fiber coupling. While primarily described herein as an optical signal (e.g., consisting of non-ionizing electromagnetic radiation), in various other examples, the received signal may instead be a radio-frequency signal, or other communication signal.

In various examples, the received optical signal has one or more symbols encoded thereon at a modulated symbol repetition rate. The modulated symbol repetition rate is modulated relative to a nominal symbol repetition rate of the optical signal. For instance, an optical transmitter may implement a modulation scheme that converts a data payload to a symbol set encoded on the optical signal by modulating one or more properties of a carrier waveform to encode those symbols on the carrier waveform at the nominal symbol repetition rate. In various examples, the modulation scheme may include, but is not limited to, Phase-Shift Keying (PSK), Quadrature Amplitude Modulation (QAM), M-ary, M-PSK, and Intensity Modulation (IM).

As discussed herein, the nominal symbol repetition rate is a constant time period between individual symbols within set of symbols encoded on the optical signal. In various examples, the nominal symbol repetition rate of the optical signal is modulated to carry a non-persistent communication, resulting in the modulated symbol repetition rate. For instance, to modulate the symbol repetition rate, the source of the optical signal may temporally increase or decrease the nominal symbol repetition rate to temporally "shift" one or more symbol transitions in the optical signal. This variance (i.e., shift) in the timing of the optical signal may be used to convey a non-persistent communication that is distinct from the encoded symbol set.

Accordingly, in an example in which the received optical signal includes one or more phase-modulated symbols, the non-persistent communication may correspond to a temporal shift in one or more of the phase changes in the optical signal. In this manner, the optical receiver 100 may receive a non-persistent communication over an overt channel that is concurrently used for overt communications. In various examples, the temporal misalignment between the symbol transition and the nominal symbol repetition rate is of a short duration such that it has no effect (or a minimal effect) on demodulation of the overt communication. One graphical illustration of a phase-encoded optical signal that has a non-persistent communication superimposed thereon is illustrated in and further described with reference to FIG. 3.

As illustrated in FIG. 1, the optical resonator 102 is positioned to receive the optical signal. In various examples, the optical resonator 102 is an optical component capable of sensing variations, such as phase variations, amplitude variations, or frequency variations in the received optical signal. As further described below with reference to at least FIG. 2, the optical resonator 102 is configured to transform the variations in the optical signal into an intensity modulation of an output optical signal (also referred to herein as an intensity-modulated output optical signal). In particular, the optical resonator 102 is configured to accumulate resonant optical signal energy within the optical resonator 102 and convert the modulation (e.g., phase modulation) of the received optical signal to an intensity modulation of an output optical signal, in part, by interaction of the received optical signal with resonating optical signal energy within the optical resonator 102. When a variation occurs in the received optical signal, such as a phase variation, the received optical signal disrupts the resonance within the optical resonator 102 and causes intensity (or amplitude) disturbances in the output optical signal. Accordingly, disturbances (e.g., increases or decreases) in an intensity of the output optical signal correspond to the modulation of the received optical signal, and in particular, to one or more symbol transitions in the optical signal.

Figure 2:
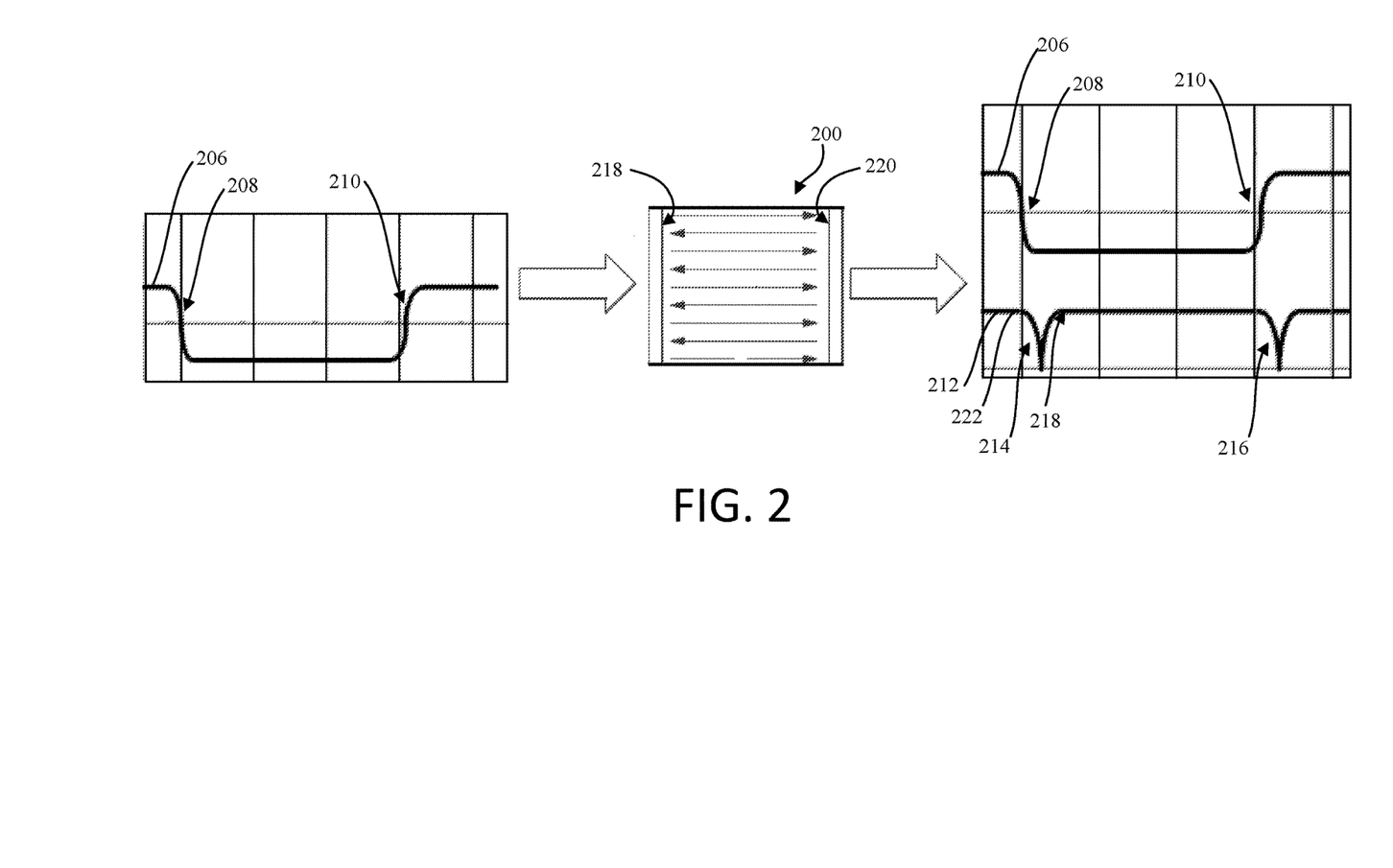
FIG. 2 illustrates an optical resonator including a graph of a signal phase of a received optical signal and a graph of an output intensity of an output optical signal, according to various examples described herein.

FIG. 2 illustrates one example of an optical resonator 200 according to various examples described herein. In particular, FIG. 2 provides a detailed illustration of one example of the optical resonator 102 shown in FIG. 1. While shown as an etalon, in other examples, the optical resonator 200 may be a micro-ring or other resonant structure. That is, examples of the optical resonators described herein are not limited to the particular arrangement illustrated in FIG. 2. For instance, in one example the optical resonator 200 may instead be a micro-ring formed of one or more waveguides arranged as a closed loop such that optical signal energy traversing "around" the loop may be phase aligned with a dimension of the loop at one or more frequencies. Accordingly, optical signal energy traversing the loop may constructively interfere, at certain frequencies, to sustain the optical signal energy within the loop. At other frequencies, optical signal energy traversing the loop will interfere and thereby destroy, or reject, a build-up of optical signal energy at that frequency. The closed loop is also coupled to an input and output to allow light to enter the loop, e.g., an aperture, and to let light out of the loop.

According to certain examples, the optical resonator 200 will coherently develop an output optical signal based on the received optical signal, and maintain a given level of the output optical signal until a variation (e.g., a phase change) of the received optical signal occurs. When a variation occurs in the received optical signal, interference causes a dependent change in the intensity (or amplitude) of the output signal. This can be seen in the input phase plot 206 and the output power plot 212 illustrated in FIG. 2. In various examples, the input phase plot 206 is representative of the phase of a received optical signal, such as the optical signal represented by arrow 114 in FIG. 1. Accordingly, a received phase-encoded optical signal, such as the received optical signal illustrated in FIG. 1, is converted to an amplitude varying signal, such as the output optical signal, by the optical resonator 200. The output optical signal is suitable for direct detection by a photodetector, such as the photodetector 104 of FIG. 1.

FIG. 2 illustrates operation of the optical resonator 200 (e.g., etalon) with reference to the output power plot 212 of the output optical signal intensity (as output power) emerging from the optical resonator 200 during a first phase transition 208 and a second phase transition 210 in the received optical signal. For purposes of illustration, in FIG. 2 the input phase plot 206 is plotted on a shared time axis (e.g., horizontal axis) with the output power plot 212. At point 222 the optical resonator 200 is in a steady-state resonance condition wherein a steady intensity of light emerges from the optical resonator 200. At point 214 the first phase transition 208 occurs in the arriving optical signal, temporarily disrupting the steady-state and causing a change in the emerging light intensity. During successive reflections of the received optical signal inside the optical resonator 200, resonance is re-established and the emerging light intensity increases until, at point 218, a steady intensity of light emerges when the optical resonator 200 has returned to a steady-state condition. At point 216 the second phase transition 210 occurs in the arriving optical signal, temporarily disrupting the steady-state again and causing a second change in the emerging light intensity.

As discussed, in various examples, the optical resonator 200 may be used to convert phase modulations of a received optical signal into intensity or amplitude modulations of the output optical signal. The intensity or amplitude modulated output optical signal may be converted to an electrical signal (e.g., a trigger signal) by a photodetector (e.g., photodetector 104 shown in FIG. 1), with corresponding amplitude variations representative of the phase transitions of the received optical signal. As illustrated in FIG. 2, in various examples, the optical resonator 200 is an etalon. That is, the optical resonator 200 may include a pair of parallel semi-reflective surfaces with an at least semi-transparent optical medium interposed there between. In various examples, the optical resonator 200 may include an interior (e.g., a cavity) that is defined by the pair of semi-reflective surfaces (e.g., shown as a first-semi reflective surface 218 and a second semi-reflective surface 220 in FIG. 2).

The first semi-reflective surface 218 is positioned in optical communication with the second semi-reflective surface 220. In FIG. 2, the first semi-reflective surface 218 is positioned substantially parallel and facing the second semi-reflective surface 220. As illustrated in FIG. 2, in various examples, each of the first and second semi-reflective surfaces 218, 220 are substantially planar. However, in other examples, other arrangements and surface curvatures may be used. An optical medium is positioned inside the optical resonator and interposed between the first semi-reflective surface 218 and the second semi-reflective surface 220.

The etalon may have one or more characteristic resonant frequencies, each associated with a certain wavelength of light, based upon the spacing (i.e., dimensional length) between the semi-reflective surfaces. In some examples, the surfaces are semi-reflective and also semi-transmissive, in that they allow some light through. Accordingly, the arriving optical signal may be allowed into the etalon (i.e., between the pair of semi-reflective surfaces) and may resonate inside the etalon and between the pair of semi-reflective surfaces. As illustrated, the optical signal energy resonating between the first semi-reflective surface 218 and the second semi-reflective surface 220 propagates through the optical medium.

As further illustrated in FIG. 2, some of the resonating optical signal energy inside the etalon is emitted out of the etalon through one of the semi-transmissive surfaces (referred to as the "output optical signal"). Accordingly, the first semi-reflective surface 218 and the second semi-reflective surface 220 may each also be semi-transmissive. In various examples, one of the first semi-reflective surface 218 and the second semi-reflective surface 220 may form an entrance aperture (shown as the first semi-reflective surface 218 in FIG. 2) through which the arriving optical signal is received and directed into the inside of the etalon. The other of the first semi-reflective surface 218 and the second semi-reflective surface 220 (shown as second the semi-reflective surface 220 in FIG. 2) forms an optical output from which the output optical signal is emitted. That is, the second semi-reflective surface 220 allows a portion of trapped resonating optical signal energy from the interior to emerge as the output optical signal. Accordingly, the second semi-reflective surface 200 is also semi-transmissive, such that optical signal energy arriving at the second semi-reflective surface is partially reflected back to the interior and partially transmitted through the output.

As discussed, a change in phase, frequency, or amplitude of the arriving optical signal (e.g., corresponding to a symbol transition) causes a change in the intensity of the emerging output optical signal energy. A large phase transition in the arriving optical signal, for example, causes a large (but temporary) intensity change in the emerging output optical signal energy. Similar operation occurs in a micro-ring or other optical resonator. Accordingly, in various examples, the optical resonator 200 functions as a modulation converter for the received optical signal. The emerging output optical signal energy may therefore carry the same information content as the arriving optical signal, but in an intensity modulated form.

The use of the term "etalon" throughout this disclosure is not intended to be limiting and as used herein may include any of multiple structures, including plates with reflecting surfaces as well as parallel mirrors with various materials positioned in-between, and in particular examples, with controllable optical materials positioned in-between. The spacing between the semi-reflective surfaces of an etalon may be referred to herein as a cavity, but is not so limited. That is the resonant cavities may include other structures, such interferometers and the like. Additionally, etalon structures may be formed as a laminate, layer, film, coating, or the like.

In some examples, an etalon may include reflective surfaces (including semi-reflective surfaces) that are not co-planar and/or are not co-linear. For example, an interior reflective surface of the etalon may include some curvature, and an opposing surface may also be curved such that a distance between the two surfaces is substantially constant across various regions of the optical resonator, in some examples. In other examples, the etalon may have non-linear or non-planar surfaces with varying distances between the surfaces at various regions, and may still function as an optical resonator for various wavelengths and at various regions, suitable for use in examples discussed herein. Accordingly, the optical resonator of various examples may be purposefully designed to conform to a surface, or to have various regions responsive to differing wavelengths, or responsive to differing angles of arrival for a given wavelength, in certain examples.

Returning to FIG. 1, the intensity-modulated output optical signal is directed to the photodetector 104, which may include an optical-electrical converter (OEC), such as a photodiode. The photodetector 104 converts the intensity-modulated output optical signal into an electrical signal. The photodetector 104 may produce an amplitude-modulated signal representative of the intensity-modulated output optical signal. In various examples described herein, the amplitude-modulated signal may be a trigger signal. The amplitude-modulated signal is then provided to the signal processing circuitry, 118 as shown in FIG. 1. In some examples, the amplitude-modulated signal representative of the intensity-modulated output optical signal may be a digital signal converted to a digital form by an analog to digital converter. In such an arrangement, the digital signal, which may also be referred to as the trigger signal, is provided to the signal processing circuitry 118 for digital processing. While illustrated in FIG. 1 as being separate from the signal processing circuitry 118, in various other examples, the photodetector 104 may instead be integrated within the signal processing circuitry 118. Similarly, in examples in which the optical receiver 100 includes an analog to digital converter, the analog to digital converter may be integrated within the signal processing circuitry 118.

In various examples, the signal processing circuitry 118 includes at least the illustrated clock 108, non-persistent communication decoder 110, and filter 112. Each of the clock 108, the non-persistent communication decoder 110, and the filter 112 may be a specialized hardware component or a specialized software component. Though the components of the example signal processing circuitry 118 shown in FIG. 1 may be shown and described as discrete elements in a block diagram, and may be referred to as "component", "module", "circuitry", or "circuit," unless otherwise indicated, the components may be implemented as one of, or a combination of, analog circuitry or digital circuitry. For instance, each component may be composed of an array of logic blocks arranged to perform one or more of the corresponding signal processing operations described herein. In particular, each of the clock 108, the non-persistent communication decoder 110, and the filter 112 may implemented by an array of transistors arranged in an integrated circuit that provides a performance and power consumption similar to an ASIC (application-specific integrated circuit) or an FPGA (field-programmable gate array). In other examples, components of the signal processing circuitry 118 may be implemented as one or more microprocessors executing software instructions (e.g., predefined routines). In particular, the software instructions may include digital signal processing (DSP) instructions. One example of a processing system for executing such predefined routines is described herein with reference to FIG. 5.

Unless otherwise indicated, signal lines between components of the optical receiver 100 may be implemented as discrete analog, digital, or optical signal lines. For example, each of the photodetector 104, the clock 108, the non-persistent communication decoder 110, and the filter 112 may be coupled by an interconnection element, such as a bus or other connection for exchanging data and/or instructions. The bus may include one or more physical busses and may include any communication coupling between system components including specialized or standard computing bus technologies. Thus, the bus enables communications (for example, data and instructions) to be exchanged between components of the signal processing circuitry 118.

As illustrated, the signal processing circuitry 118 is coupled to the photodetector 104 and may receive the intensity-modulated output optical signal, and in particular, receive a trigger signal that is representative of the intensity-modulated output optical signal from the photodetector 104. However, in other examples, the direct output of the optical resonator 102 (i.e., the intensity-modulated output optical signal) may be provided directly the non-persistent communication decoder 110. As shown, the non-persistent communication decoder 110 is further coupled to the clock 108 and the filter 112.

Figure 3:
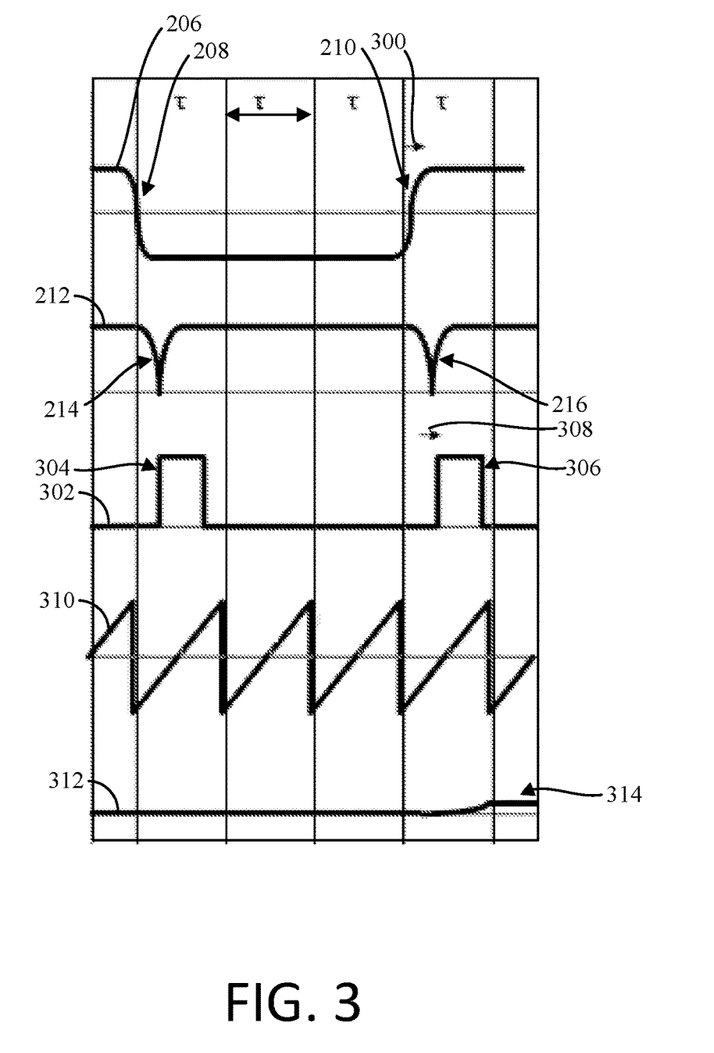
FIG. 3 is a waveform plot of various signals described with reference to the optical receiver illustrated in FIG. 1, according to various examples described herein.

Referring to FIG. 3, illustrated is an input phase plot 206 of a received optical signal (e.g., as also shown in FIG. 2), an output power plot 212 of the output optical signal (e.g., as also shown in FIG. 2), a trigger signal 302, a reference signal 310, and a mixed signal 312, each plotted on a shared time axis, i.e., the illustrated horizontal axis. FIG. 3 is described with continuing reference to the optical receiver 100 illustrated in FIG. 1, and the optical resonator 200 illustrated in FIG. 2. In FIG. 3, the input phase plot 206 is shown as having a nominal symbol repetition rate, "τ". The illustrated input phase plot 206 shows two symbol transitions 208, 210, which may each, for example, correspond to a phase change of a BPSK signal. In FIG. 3, the nominal symbol repetition rate of the optical signal is modulated (e.g., by a non-persistent communication) such that the second symbol transition 210 is temporally shifted relative to the nominal symbol repetition rate. For instance, FIG. 3 illustrates the second symbol transition 210 temporally misaligned with the nominal symbol repetition rate by a time delay 300. As further illustrated in FIG. 3, this temporal shift is also present in the output power plot 212. While only the symbol transition 210 is illustrated as temporally shifted in FIG. 3, it is appreciated that in various other examples, the first symbol transition 208 may also be shifted, and in particular, may be shifted by a time delay different than the time delay 300.

As discussed, in various examples, the amplitude-modulated signal that is representative of the intensity-modulated output optical signal is referred to as a trigger signal. FIG. 3 shows one example of a trigger signal 302. While in one example, the trigger signal 302 is an analog signal, in various other examples, it may be in a digital form. As illustrated in FIG. 3, the trigger signal 302 includes one or more pulses (e.g., amplitude modulations) that are temporally aligned to the variation(s) in the intensity-modulated output optical signal. In FIG. 3, the trigger signal 302 is illustrated as having a first pulse 304 that corresponds to the first amplitude variation (e.g., at point 214) in the output power plot 212, and a second pulse 306 that corresponds to the second amplitude variation (e.g., at point 216) in the output power plot 212. In particular, the first pulse 304 has a rising edge that temporally coincides with the first variation, and the second pulse 306 has a rising edge that temporally coincides with the second variation. Accordingly, the shift in the timing of the optical signal, as a result of the modulated symbol repetition rate, is also present in the trigger signal 302. In FIG. 3, the shift in the trigger signal 302 is represented by the time delay 308. Each pulse 304, 306 may have a predetermined fixed-shape duration that is shorter than the illustrated nominal symbol repetition rate. For instance, each of the first pulse 304 and second pulse 306 may be a square pulse that has a non-zero value for a duration less than τ.

As shown in FIG. 1, the clock 108 is coupled to the non-persistent communication decoder 110. The clock 108 is configured to generate a reference signal, and in particular, a reference signal that has a reference repetition rate that corresponds to the nominal symbol repetition rate of the received optical signal. For instance, the clock 108 may provide a reference signal that has a reference repetition rate that is temporally synchronized (e.g., aligned) with the nominal symbol repetition rate. FIG. 3 shows one example of a reference signal 310 that is temporally aligned in such a manner. As discussed herein, the reference repetition rate of the reference signal 310 refers to the rate of oscillation of a clock signal between a high state and a low state or vice versa. While shown in FIG. 3 as a saw clock signal, in various other examples, the reference signal 310 may be a square-wave clock signal, or another type of continuous clock signal. The clock 108 may include any suitable precision clock generator, such as a crystal oscillator.

The non-persistent communication decoder 110 is configured to receive the trigger signal 302 and the reference signal 310 and determine the temporal misalignment between the symbol transition(s) and the nominal symbol repetition rate, based at least in part on the reference repetition rate of the reference signal 310 and the trigger signal 302. In particular, the temporal misalignment between the reference repetition rate of the reference signal 310 and symbol transition(s) is representative of the non-persistent communication. In at least one example, the non-persistent communication decoder 110 is configured to mix the reference signal 310 and the trigger signal 302 to generate a mixed signal. For instance, the non-persistent communication decoder 110 may include an electronic mixer that combines the trigger signal 302 and the reference signal 310 into a composite signal. The electronic mixer may be additive or multiplicative. One example of a mixed signal 312 is shown in FIG. 3.

In particular, FIG. 3 shows a mixed signal 312 based on the illustrated reference signal 310 and the illustrated trigger signal 302. In various examples, and in the plot of FIG. 3, a magnitude of the mixed signal 312 is proportional to the temporal misalignment between the nominal symbol repetition rate and the symbol transition(s). That is, the magnitude of the mixed signal 312 is proportional to the temporal misalignment that results from the time delay 300. For instance, in FIG. 3, the mixed signal 312 is shown as having a non-zero magnitude at point 314, which corresponds to the time delay 300. In this regard, the non-persistent communication decoder 110 is configured to demodulate (i.e., decode) the non-persistent communication that is overlaid on the received optical signal. While in some examples, the non-persistent communication may be the jitter of the source of the optical signal, such as the clock jitter, in other examples the non-persistent communication may correspond to other information.

While in some examples, the non-persistent communication decoder 110 may mix the trigger signal 302 and the reference signal 310 to demodulate the non-persistent communication, in various other examples, the non-persistent communication decoder 110 may receive the direct output of the optical resonator 102, i.e., the intensity-modulated output optical signal energy, and mix the direct output of the optical resonator 102 with the reference signal 310 to generate the mixed signal 312. That is, in some examples, the intensity-modulated output optical signal may be used in the same way as the trigger signal 302. For instance, if Binary Phase-Shift Keying (BPSK) is used to modulate the received optical signal, the intensity-modulated output optical signal energy and the reference signal 310 may be mixed to directly demodulate the non-persistent communication, as discussed above.

As also illustrated in FIG. 1, in some examples, the mixed signal 312 may be provided from the non-persistent communication decoder 110 to the filter 112, which may include one or more analog or digital filters. While in one example, the illustrated filter 112 is a low-pass filter that removes high-frequency signal components of the mixed signal and passes low-frequency signal components, in other examples, the filter 112 may be a bypass filter. In various examples, a cutoff frequency of the filter 112 (e.g., low-pass filter) may be about 10 MHz (e.g., +/−1 MHz), and in some particular examples, may be even lower. That is, in most cases the overt communication of the received optical signal is within a high-frequency range (e.g., Gb/s), whereas the non-persistent communication may be in the hundreds of Kb/s or several Mb/s range.

As illustrated in input phase plot 206 shown in FIG. 3, in many instances, the received optical signal may have more than one phase transition. While components of the described optical receiver 100 are configured to detect the presence of each new symbol (e.g., detect each symbol transition), the described optical receiver 100 is nevertheless insensitive to what that actual new symbol is. For at least this reason, the described optical receiver 100 operates independent of overt communication demodulation operations performed on the optical signal.

Figure 4:
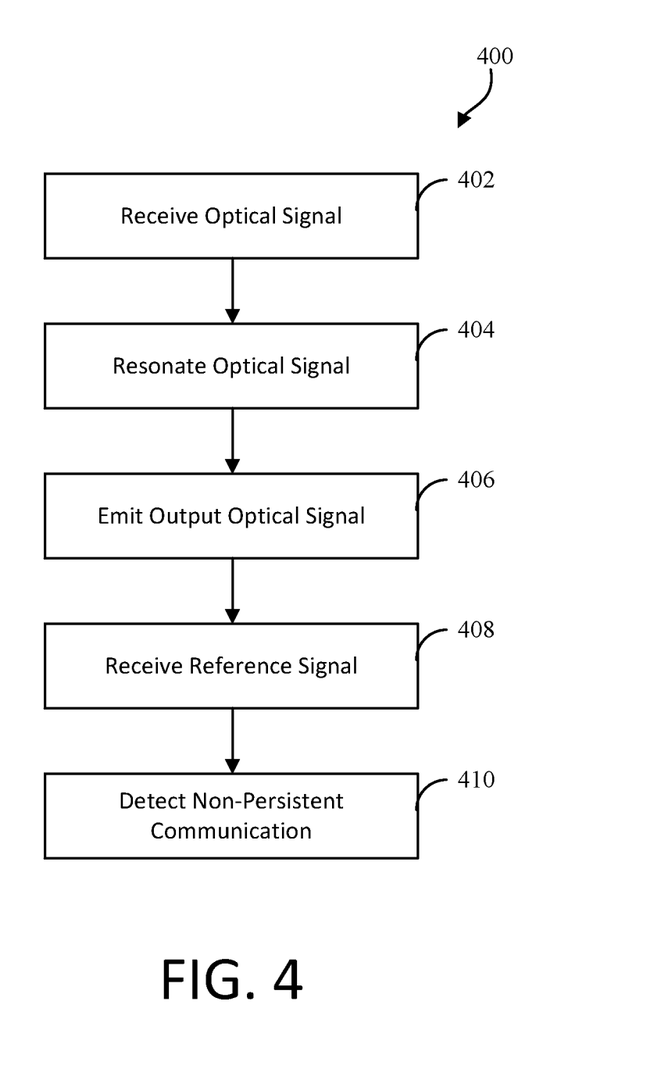
FIG. 4 is a process flow for detecting a non-persistent communication superimposed on an overt communication channel, according to various examples described herein.

As discussed above, various examples perform processes for detecting a non-persistent communication superimposed on an overt communication channel. In some examples, these processes are executed by an optical receiver, such as the optical receiver 100 described above with reference to FIG. 1. In particular examples, the optical receiver 100 may include an optical resonator, such as the optical resonator 200 described with reference to FIG. 2. One example of a process for detecting a non-persistent communication superimposed on an overt communication channel is illustrated in FIG. 4. FIG. 4 is described with continuing reference to the optical receiver 100 illustrated in FIG. 1. In various examples, the process 400 may include receiving an optical signal having one or more symbols encoded thereon at a modulated symbol repetition rate, resonating the optical signal in an optical resonator, and emitting an intensity-modulated output optical signal with a variation in an intensity thereof corresponding to a symbol transition in the received optical signal. The process 400 may further include receiving a reference signal, and determining a temporal misalignment between the symbol transition and a nominal symbol repetition rate of the received optical signal based on the reference signal and the intensity-modulated output optical signal.

In act 402, the process 400 may include receiving the optical signal having one or more symbols encoded thereon at a modulated symbol repetition rate. As previously discussed, the modulated symbol repetition rate has one or more temporal modulations relative to a nominal symbol repetition rate of the received optical signal. In act 404, the process 400 includes resonating the received optical signal within an optical resonator, such as the optical resonator 102 illustrated in FIG. 1. For instance, act 404 may include resonating the optical signal within the optical resonator 102 by trapping the optical signal between a pair of semi-reflective surfaces and reflecting at least a portion of the optical signal between the pair of semi-reflective surfaces. As previously discussed, the optical resonator 102 is configured to transform the variations in the optical signal (e.g., phase transitions) into an intensity modulation of an output optical signal.

Accordingly, in act 406, the process 400 may include emitting an intensity-modulated output optical signal from the optical resonator 102, where the intensity-modulated output optical signal includes a variation in the intensity (or amplitude) thereof that corresponds to a symbol transition in the optical signal. In various examples, the process 400 may include converting the modulation (e.g., phase modulation) of the received optical signal to the intensity modulation of the output optical signal, in part, by interaction of the received optical signal with the resonating optical signal energy within the optical resonator 102. When the transition occurs in the received optical signal, the received optical signal disrupts the resonance within the optical resonator 102 and causes the intensity (or amplitude) disturbances in the output optical signal.

In act 408, the process 400 includes receiving a reference signal having a reference repetition rate that corresponds to the nominal symbol repetition rate of the received optical signal. In various examples, the reference signal may be generated by the clock 108, and may be a saw clock signal or a square-wave clock signal. In particular examples, the reference repetition rate of the reference signal is temporally aligned with the nominal symbol repetition rate. In act 410, the process 400 includes determining, based on the reference signal and the intensity-modulated output optical signal, a temporal misalignment between the symbol transition and the nominal symbol repetition rate. The temporal misalignment is representative of the non-persistent communication.

While in one example, act 410 may include mixing the reference signal and the intensity-modulated output optical signal to generate a mixed signal having a magnitude proportional to the temporal misalignment, in various other examples, the reference signal may be mixed with a trigger signal to generate the mixed signal. In such an example, the trigger signal may be an amplitude-modulated signal representative of the intensity-modulated output optical signal. That is, the trigger signal may have one or more pulses temporally aligned to the variations in the intensity-modulated output optical signal. While not explicitly illustrated in FIG. 4, the process 400 may include additional acts and sub-acts. Additional acts and sub-acts are further described above with reference to FIGS. 1-4.

Figure 5:
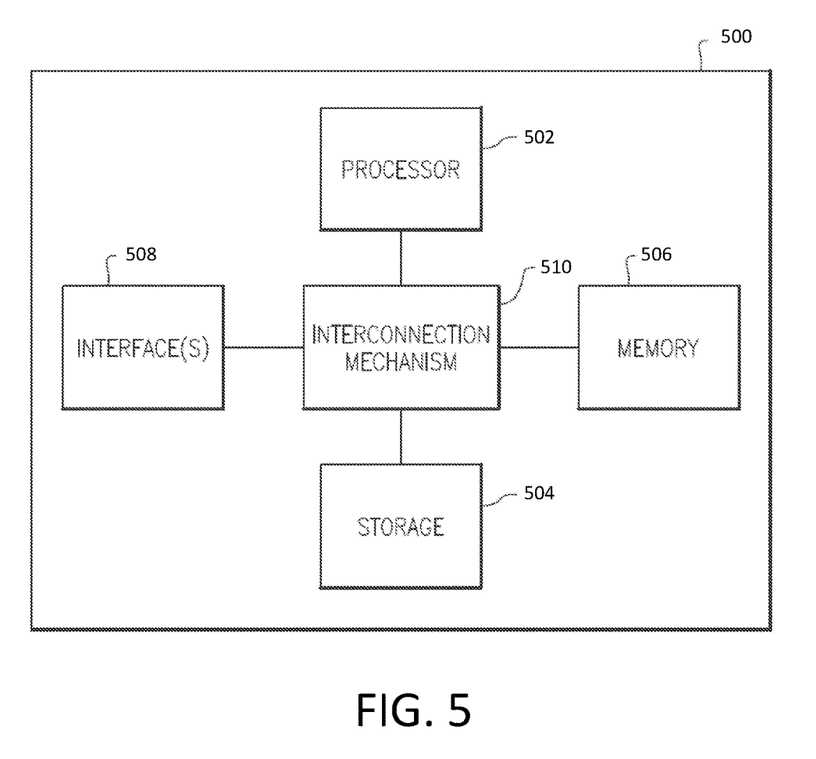
FIG. 5 is a functional block diagram of an example of a processing system that may be configured to implement various examples of the processes described herein.

FIG. 5 illustrates one example of a processing system 500 that may implement predefined software routines corresponding to the non-persistent communication decoder and/or filter, as illustrated in FIG. 1, and/or other components of the optical receiver 100. The processing system 500 may include a processor 502, data storage 504, a memory 506, and one or more interfaces 508, such as a system interface and/or a user interface. While not explicitly illustrated in FIG. 5, in certain examples the processing system 500 may be coupled to a power source. The power source may deliver power to one or more components of the processing system 500, as well as other components of the optical receiver 100.

In FIG. 5, the processor 502 is coupled to the data storage 504, memory 506, and the various interfaces 508. The memory 506 stores programs (e.g., sequences of instructions coded to be executable by the processor 502) and data during operation of the processing system 500. Thus, the memory 506 may be a relatively high performance, volatile, random access memory such as a dynamic random access memory ("DRAM") or static memory ("SRAM"). However, the memory 506 may include any device for storing data, such as a disk drive or other nonvolatile storage device. Various examples may organize the memory 506 into particularized and, in some cases, unique structures to perform the functions disclosed herein. These data structures may be sized and organized to store values for particular data and types of data.

The data storage 504 includes a computer readable and writeable data storage medium configured to store non-transitory instructions and other data, and can include non-volatile storage medium, such as optical or magnetic disk, ROM or flash memory. The instructions may include executable programs or other code that can be executed by the at least one processor 502 to perform any of the functions described herein.

In various examples, the processing system 500 includes several interface components 508, such as a system interface and/or a user interface. Each of the interface components 508 is configured to exchange, e.g., send or receive, data with other components of the processing system 500 (and/or associated transmitter or receiver), or other devices in communication with the processing system 500. According to various examples, the interface components 508 may include hardware components, software components, or a combination of hardware and software components. In certain examples, components of the system interface couples the processor 502 to one or more other components of the optical receiver 100 shown in FIG. 1. The system interface may provide one or more control signals to any such components and may manage the operation of such components, as described above.

A user interface may include hardware and/or software components that allow a corresponding optical receiver in which the processing system 500 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the processing system 500. Data received at the various interfaces may be provided to the processor 502, as illustrated in FIG. 5. Communication coupling (e.g., shown interconnection mechanism 510) between the processor 502, memory 506, data storage 504, and interface(s) 508 may be implemented as one or more physical busses in conformance with standard, proprietary, or specialized computing bus technologies.

The processor 502 performs a series of routines (e.g., digital signal processing instructions) that result in manipulated data that is stored in and retrieved from the data storage 504, as discussed above. In various examples, the series of instructions result in interpretation of the outputs from an optical resonator, as discussed above. Such instructions may correspond to commands for interpreting peaks and troughs of such output signals to determine symbol transitions, and recovering a non-persistent communication therefrom based on one or more temporal misalignments in the symbol transitions relative to a nominal symbol repetition rate.

The processor 502 may be any type of processor, multi-processor or controller, whether commercially available or specially manufactured. For instance, the processor may include a processor manufactured by INTEL, AMD, MOTOROLA, or FREESCALE. In some examples, the processor 502 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Portions of the disclosure herein make reference to orders of magnitude of distance, e.g., length, and time, e.g., duration, of aspects of light signals, with regard to the length or duration of a segment of light or a wavelength of light. It is to be understood that distance and duration may at times be used interchangeably with respect to light and optical systems, and unless the context implies otherwise, the relationship between distance and duration with respect to light is the speed of light in the medium of propagation. For example, phase relationships are on the order of one wavelength of light, and a wavelength is directly inversely proportional to frequency by the speed of light in the propagation medium. Similarly, segments of light generated by modulation of a light source are on the order of the segment length, which is directly inversely proportional to modulation rate by the speed of light in the propagation medium.

As discussed, various aspects and examples described herein provide non-persistent communication receivers and related methods for detecting a non-persistent communication superimposed on an overt communication channel. In various examples, the optical receivers may be insensitive to the particular data payload corresponding to the one or more symbols and may decode the non-persistent communication independent of processes for decrypting the data payload.

What is claimed is:

1. An optical receiver comprising:
  an optical resonator positioned to receive an optical signal having one or more symbols encoded thereon at a modulated symbol repetition rate, the modulated symbol repetition rate being modulated relative to a nominal symbol repetition rate of the optical signal, wherein the optical resonator is configured to emit an intensity-modulated output optical signal, the intensity-modulated output optical signal having a variation in an intensity thereof corresponding to a symbol transition in the one or more symbols encoded on the optical signal; and
  signal processing circuitry coupled to the optical resonator, the signal processing circuitry including:
    a clock configured to generate a reference signal, the reference signal having a reference repetition rate that corresponds to the nominal symbol repetition rate of the optical signal,
    a photodetector configured to generate a trigger signal having a pulse temporally aligned to the variation in the intensity-modulated output optical signal, and
    a non-persistent communication decoder configured to determine a temporal misalignment between the symbol transition and the nominal symbol repetition rate based at least in part on the reference repetition rate of the reference signal and the trigger signal, the temporal misalignment being representative of a non-persistent communication.

2. The optical receiver of claim 1, wherein the temporal misalignment is a jitter of a source of the optical signal.

3. The optical receiver of claim 2, wherein the optical signal is a phase-modulated optical signal, and wherein the symbol transition corresponds to a phase change in the optical signal.

4. The optical receiver of claim 3, wherein the non-persistent communication decoder is configured to mix the reference signal and the trigger signal to generate a mixed signal, and wherein a magnitude of the mixed signal is proportional to the temporal misalignment.

5. The optical receiver of claim 4, wherein the pulse of the trigger signal is shorter in duration than the nominal symbol repetition rate.

6. The optical receiver of claim 4, further comprising a low-pass filter coupled to non-persistent communication decoder and configured to filter the mixed signal.

7. The optical receiver of claim 1, wherein the clock is configured to generate at least one of a saw clock signal and a square-wave clock signal as the reference signal, and the reference repetition rate of the reference signal is temporally aligned with the nominal symbol repetition rate.

8. An optical receiver comprising:
  an optical resonator having a pair of semi-reflective surfaces positioned to receive an optical signal having one or more symbols encoded thereon at a modulated symbol repetition rate, the modulated symbol repetition rate being modulated relative to a nominal symbol repetition rate of the optical signal, wherein the optical resonator is configured to resonate the optical signal between the pair of semi-reflective surfaces and emit an intensity modulated output optical signal, and wherein the intensity-modulated output optical signal has a variation in an intensity thereof corresponding to a symbol transition in the one or more symbols encoded on the optical signal; and
  signal processing circuitry coupled to the optical resonator, the signal processing circuitry including:
    a clock configured to generate a reference signal, the reference signal having a reference repetition rate that corresponds to the nominal symbol repetition rate of the optical signal, and
    a non-persistent communication decoder configured to determine a temporal misalignment between the symbol transition and the nominal symbol repetition rate based at least in part on the reference repetition rate of the reference signal and the intensity-modulated output optical signal, the temporal misalignment being representative of a non-persistent communication.

9. The optical receiver of claim 8, wherein the temporal misalignment is a jitter of a source of the optical signal.

10. The optical receiver of claim 9, wherein the optical signal is a phase-modulated optical signal, and wherein the symbol transition corresponds to a phase change in the optical signal.

11. The optical receiver of claim 10, wherein the non-persistent communication decoder is configured to mix the reference signal and the intensity-modulated output optical signal to generate a mixed signal, and wherein a magnitude of the mixed signal is proportional to the temporal misalignment.

12. The optical receiver of claim 11, further comprising a low-pass filter coupled to non-persistent communication decoder and configured to filter the mixed signal.

13. The optical receiver of claim 8, wherein the clock is configured to generate at least one of a saw clock signal and a square-wave clock signal as the reference signal, and the reference repetition rate of the reference signal is temporally aligned with the nominal symbol repetition rate.

14. A method of detecting a communication superimposed on an overt communication channel, the method comprising:
  receiving an optical signal having one or more symbols encoded thereon at a modulated symbol repetition rate, the modulated symbol repetition rate being modulated relative to a nominal symbol repetition rate of the optical signal;
  resonating the optical signal within an optical resonator;
  emitting an intensity-modulated output optical signal from the optical resonator, the intensity-modulated output optical signal having a variation in an intensity thereof corresponding to a symbol transition in the one or more symbols encoded on the optical signal;
  receiving a reference signal, the reference signal having a reference repetition rate that corresponds to the nominal symbol repetition rate of the optical signal; and
  determining, based on the reference signal and the intensity-modulated output optical signal, a temporal misalignment between the symbol transition and the nominal symbol repetition rate, the temporal misalignment being representative of a non-persistent communication.

15. The method of claim 14, wherein resonating the optical signal within the optical resonator includes trapping the optical signal between a pair of semi-reflective surfaces by reflecting at least a portion of the optical signal between the pair of semi-reflective surfaces.

16. The method of claim 15, wherein determining the temporal misalignment includes mixing the reference signal and the intensity-modulated output optical signal to generate a mixed signal, wherein a magnitude of the mixed signal is proportional to the temporal misalignment.

17. The method of claim 14, further comprising generating a trigger signal, the trigger signal having a pulse temporally aligned to the variation in the intensity-modulated output optical signal.

18. The method of claim 17, wherein determining the temporal misalignment includes mixing the reference signal and the trigger signal to generate a mixed signal, and wherein a magnitude of the mixed signal is proportional to the temporal misalignment.

19. The method of claim 18, further comprising low-pass filtering the mixed signal.

20. The method of claim 14, further comprising generating at least one of a saw clock signal and a square-wave clock signal as the reference signal, wherein the reference repetition rate of the reference signal is temporally aligned with the nominal symbol repetition rate.

* * * * *